US012104026B2

(12) United States Patent
Gerrits et al.

(10) Patent No.: US 12,104,026 B2
(45) Date of Patent: Oct. 1, 2024

(54) PACKAGE COMPRISING A BI-DIRECTIONALLY ORIENTED POLYETHYLENE FILM

(71) Applicant: SABIC GLOBAL TECHNOLOGIES B.V., Bergen op Zoom (NL)

(72) Inventors: Niclasina Siberta Johanna Alberdina Gerrits, Sittard (NL); Attilio Scala, Maastricht (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 280 days.

(21) Appl. No.: 17/639,073

(22) PCT Filed: Aug. 28, 2020

(86) PCT No.: PCT/EP2020/074067
§ 371 (c)(1),
(2) Date: Feb. 28, 2022

(87) PCT Pub. No.: WO2021/043678
PCT Pub. Date: Mar. 11, 2021

(65) Prior Publication Data
US 2022/0298317 A1  Sep. 22, 2022

(30) Foreign Application Priority Data
Sep. 3, 2019  (EP) .................... 19195069

(51) Int. Cl.
*C08J 5/18* (2006.01)
*B32B 27/08* (2006.01)
*B32B 27/32* (2006.01)

(52) U.S. Cl.
CPC ............. *C08J 5/18* (2013.01); *B32B 27/08* (2013.01); *B32B 27/32* (2013.01); *B32B 2307/518* (2013.01); *B32B 2439/70* (2013.01); *C08J 2323/06* (2013.01)

(58) Field of Classification Search
None
See application file for complete search history.

(56) References Cited

U.S. PATENT DOCUMENTS

| 4,285,681 | A | * | 8/1981 | Walitalo | ............. | B29C 66/4312 |
| | | | | | | 493/203 |
| 5,306,549 | A | * | 4/1994 | Isozaki | ................... | B32B 27/32 |
| | | | | | | 428/910 |
| 2010/0203277 | A1 | * | 8/2010 | Michie, Jr. | ............ | C08F 210/16 |
| | | | | | | 526/352 |
| 2013/0345377 | A1 | * | 12/2013 | Ker | ............................ | C08J 5/18 |
| | | | | | | 526/170 |
| 2015/0252159 | A1 | * | 9/2015 | Ker | ........................ | C08F 210/16 |
| | | | | | | 526/161 |
| 2017/0008984 | A1 | * | 1/2017 | Ding | ...................... | C08F 210/02 |
| 2017/0008994 | A1 | * | 1/2017 | Wang | ................... | C09D 161/34 |
| 2017/0021599 | A1 | * | 1/2017 | Pan | ......................... | B32B 27/08 |
| 2019/0382514 | A1 | | 12/2019 | Ding et al. | | |

FOREIGN PATENT DOCUMENTS

| EP | 2931763 B1 * | 1/2018 | ............ B32B 27/32 |
| EP | 3590994 A1 | 1/2020 | |
| WO | 2014089671 A1 | 6/2014 | |

OTHER PUBLICATIONS

International Search Report for International Application No. PCT/EP2020/074067, International Filing Date Aug. 28, 2020, Date of Mailing Nov. 25, 2020, 7 pages.
Written Opinion for International Application No. PCT/EP2020/074067, International Filing Date Aug. 28, 2020, Date of Mailing Nov. 25, 2020, 16 pages.

* cited by examiner

*Primary Examiner* — John Vincent Lawler
(74) *Attorney, Agent, or Firm* — CANTOR COLBURN LLP

(57) ABSTRACT

The present invention relates to a package comprising a bi-directionally oriented polyethylene film, wherein the bi-directionally oriented film comprises a polymer having moieties derived from ethylene and moieties derived from 1-hexene, wherein the polymer has: (a) a density of ≥910 and ≤930 kg/m3, preferably ≥916 and ≤925 kg/m3, as determined in accordance with ASTM D792 (2008); (b) a melt mass-flow rate of ≥0.2, preferably ≥0.5 or ≥0.6, and ≤5.0 g/10 min, as determined in accordance with ASTM D1238 (2013) at a temperature of 190° C. under a load of 2.16 kg; (c) a fraction that is eluted in analytical temperature rising elution fractionation (a-TREF) at a temperature ≤30.0° C. of ≥8.0 wt %, preferably ≥11.0 wt %, with regard to the total weight of the polymer; and (d) a fraction eluted in a-TREF at a temperature >94.0° C. of ≥20.0 wt %, with regard to the total weight of the polymer; and preferably (e) a fraction eluted in a-TREF at a temperature >30.0° C. and ≤94.0° C. of ≥40.0 and ≤64.0 wt %, with regard to the total weight of the polymer; wherein the package is a bag or pouch containing at least one seal obtained by thermal sealing of two layers of the polyethylene film. Such package allows for handling, in particular opening, in a controlled way such that when a tear is introduced to open the package, that tear can be introduced in a controlled line.

13 Claims, No Drawings

PACKAGE COMPRISING A BI-DIRECTIONALLY ORIENTED POLYETHYLENE FILM

CROSS REFERENCE TO RELATED APPLICATIONS

This application is a National Stage application of PCT/EP2020/074067, filed Aug. 28, 2020, which claims the benefit of European Application No. 19195069.0, filed Sep. 3, 2019, both of which are incorporated by reference in their entirety herein.

The present invention relates to a package comprising a bi-directionally oriented film.

In the field of packaging, there is an ongoing need for reduction of the quantity of material that is used to manufacture the package. Such reduction clearly provides benefits in that the package will have a lower weight, utilises less materials resources, and, after having ended its service life, will result in a reduced quantity of waste.

In a great variety of packaging applications, the package as a whole, or a part of a package, may be manufactured from polymer films. In particular, polyethylene materials are suitable and widely employed materials in all sorts of packaging.

In order to reduce the weight of a polyethylene film, one option is to reduce the thickness of the film. However, typically a reduction of thickness of such film leads to a deterioration of the properties of the film, such as its mechanical properties.

A means of increasing the mechanical properties of a polyethylene film of reduce thickness is to manufacture such film starting from a film having a higher thickness, and subjecting this film to an orientation process at temperatures below the melting point of the polyethylene material. Such orientation thus results in the film being stretched, as a result of which the thickness of the film is reduced.

Such orientation typically is performed via a bi-directional orientation process, wherein first a film is produced via cast film extrusion, which is then, after cooling to below the melting temperature, subjected to a stretching force to induce orientation in the machine direction, i.e. the direction in which the film is manufactured in the film extrusion process, and subsequently subjected to a stretching force in the transverse direction, i.e. the direction perpendicular to the machine direction in the plane of the film.

Such bi-directionally oriented polyethylene film may have film properties, such as mechanical properties, that are far superior to those of a polyethylene film having a similar thickness, but produced via conventional film production processes such as cast extrusion or blown film production, wherein the film is not subjected to stretching at temperatures below the melting point of the film.

In the field of packaging, there are certain properties that packages desirably comply with in order to suitably qualify for a given type of packaging application. A particular property in this regard is the tear behaviour of a film. It is desirable that any tear that is introduced into a package behaves in a controlled way; in other words, a tear that is made in a package, such as to open a package for consumption, desirably propagates according to a pre-defined route. This is referred to as controlled tear. It means that an induced tear propagatesas a non-oblique tear according to the test method of ASTM D1922-15, using the constant radius specimen of FIG. 1 of ASTM D1922-15. ASTM D1922-15 presents a method to determine the nature of propagation of a tear that is introduced into a film specimen. It defines that if the line of tear exceeds more than 60° from the vertical, such tear is an oblique tear. In the context of the current invention, it is to be understood that controlled tears, which also may be referred to as non-oblique tears, are tears that are not to be qualified as oblique according to the method of ASTM D1922-15, in other words tears that do not exceed the 60° from the vertical.

As can be understood, it is desirable that a package demonstrates a particularly high degree of such controlled tear. To achieve this remains the subject of developments, and has now been achieved according to the present invention by a package comprising a bi-directionally oriented polyethylene film, wherein the bi-directionally oriented film comprises a polymer having moieties derived from ethylene and moieties derived from 1-hexene, wherein the polymer has:

(a) a density of $\geq 910$ and $\leq 930$ kg/m$^3$, preferably $\geq 916$ and $\leq 925$ kg/m$^3$, as determined in accordance with ASTM D792 (2008);

(b) a melt mass-flow rate of $\geq 0.2$, preferably $\geq 0.5$ or $\geq 0.6$, and $\leq 5.0$ g/10 min, as determined in accordance with ASTM D1238 (2013) at a temperature of 190° C. under a load of 2.16 kg;

(c) a fraction that is eluted in analytical temperature rising elution fractionation (a-TREF) at a temperature $\leq 30.0°$ C. of $\geq 8.0$ wt %, preferably $\geq 11.0$ wt %, with regard to the total weight of the polymer; and (d) a fraction eluted in a-TREF at a temperature $>94.0°$ C. of $\geq 20.0$ wt %, with regard to the total weight of the polymer; and preferably (e) a fraction eluted in a-TREF at a temperature $>30.0°$ C. and $\leq 94.0°$ C. of $\geq 40.0$ and $\leq 64.0$ wt %, with regard to the total weight of the polymer.

Such package allows for handling, in particular opening, in a way such that when a tear is introduced to open the package, that tear can be introduced in a controlled manner.

In the context of the present invention, bi-directionally oriented films are to be understood to be films that have been produced by drawing a film both in the machine direction (MD), which is the direction in which the film is extruded from an extrusion process, and in the transverse direction (TD), which is the direction perpendicular to the MD in the plane of the film. Such drawing is to be applied at a drawing temperature of below the melting point of the film.

The polymer as used in the present invention has a density of $\geq 910$ and $\leq 930$ kg/m$^3$. Preferably, the polymer has a density of $\geq 910$ and $\leq 925$ kg/m$^3$. More preferably, the polymer has a density of $\geq 915$ and $\leq 925$ kg/m$^3$. Even more preferably, the polymer has a density of $\geq 916$ and $\leq 925$ kg/m$^3$, or even more preferably $\geq 916$ and $\leq 922$ kg/m$^3$.

The polymer as used in the present invention has a melt mass-flow rate determined at 190° C. under a load of 2.16 kg, also referred to as MFR2, of $\geq 0.2$ and $\leq 5.0$ g/10 min, preferably $\geq 0.5$ or $\geq 0.6$, and $\leq 5.0$ g/10 min, preferably $\geq 0.5$ or $\geq 0.6$, and $\leq 4.0$ g/10 min, more preferably $\geq 0.8$ and $\leq 3.5$ g/10 min, even more preferably $\geq 1.0$ and $\leq 3.0$ g/10 min, even more preferably $\geq 1.0$ and $\leq 2.5$ g/10 min.

The polymer as used in the invention particularly is characterised by its a-TREF fingerprint, that is, it has a particular distribution of the fractions of polymer that in a-TREF are eluted in particular defined temperature ranges in which the fractionation is performed. In particular, the polymer according to the invention has a fraction eluted in a-TREF at a temperature $>94.0°$ C. of $\geq 20.0$ wt %, with regard to the total weight of the polymer. More preferably, the polymer has a fraction eluted >94.0° C. of ≥25.0 wt %, even more preferably ≥30.0 wt %, yet even more preferably ≥35.0 wt %.

In the field of polyethylenes, the fraction of polymer that is eluted in a-TREF at a temperature of >94.0° C. reflects the quantity of linear polymeric material that is present in the particular polymer. In the present polymer, having a particular quantity of the material in this fraction, this indicates that a certain amount of linear polymeric material is to be present.

Further, the polymer as used in the present invention has a fraction that is eluted in a-TREF at a temperature ≤30.0° C. of ≥8.0 wt %, with regard to the total weight of the polymer. The fraction that is eluted at a temperature of ≤30° C. may in the context of the present invention be calculated by subtracting the sum of the fraction eluted >94° C. and the fraction eluted >30° C. and ≤94° C. from 100%, thus the total of the fraction eluted ≤30° C., the fraction eluted >30° C. and ≤94° C. and the fraction eluted >94° C. to add up to 100.0 wt %. The fraction eluted ≤30° C. preferably is ≥9.0 wt %, more preferably ≥10.0 wt %, even more preferably ≥11.0 wt %.

Preferably, the fraction that is eluted in a-TREF at a temperature ≤30.0° C. is ≥8.0 and ≤16.0 wt %, more preferably ≥9.0 and ≤14.0 wt %, even more preferably ≥10.0 and ≤14.0 wt % with regard to the total weight of the polymer; and/or preferably, the fraction that is eluted in a-TREF at a temperature >94.0° C. is ≥20.0 and ≤50.0 wt %, more preferably 25.0 and ≤45.0 wt %, even more preferably ≥30.0 and ≤40.0 wt %, with regard to the total weight of the polymer; and/or preferably, the fraction that is eluted in a-TREF at a temperature >30.0° C. and ≤94.0° C. is ≥40.0 and ≤64.0 wt %, more preferably ≥45.0 and ≤60.0 wt %, even more preferably is ≥45.0 and ≤55.0 wt %.

it is preferred that the weight fraction that is eluted in a-TREF at a temperature of >30.0° C. and ≤94.0° C. is greater than the weight fraction that is eluted in a-TREF at a temperature of >94.0° C. Preferably, the fraction eluted >30.0° C. and ≤94.0° C. is at least 5.0 wt % greater than the fraction eluted >94.0° C., wherein the fractions are expressed with regard to the total weight of the polymer.

According to the invention, analytical temperature rising elution fractionation, also referred to as a-TREF, may be carried out using a Polymer Char Crystaf-TREF 300 with a solution containing 4 mg/ml of sample prepared in 1,2-dichlorobenzene stabilised with 1 g/l Topanol CA (1,1,3-tri (3-tert-butyl-4-hydroxy-6-methylphenyl)butane) and 1 g/l Irgafos 168 (tri(2,4-di-tert-butylphenyl) phosphite) at a temperature of 150° C. for 1 hour. The solution may be further stabilised for 45 minutes at 95° C. under continuous stirring at 200 rpm before analyses. For analyses, the solution was crystallised from 95° C. to 30° C. using a cooling rate of 0.1° C./min. Elution was performed with a heating rate of 1° C./min from 30° C. to 140° C. The set-up was cleaned at 150° C.

Particularly, a-TREF may be carried out using a Polymer Char Crystaf-TREF 300 using a solution containing 4 mg/ml of the polymer in 1,2-dichlorobenzene, wherein the solution is stabilised with 1 g/l 1,1,3-tri(3-tert-butyl-4-hydroxy-6-methylphenyl)butane and 1 g/l tri(2,4-di-tert-butylphenyl) phosphite) at a temperature of 150° C. for 1 hour, and optionally further stabilised for 45 minutes at 95° C. under continuous stirring at 200 rpm, wherein the prior to analyses the solution is crystallised from 95° C. to 30° C. using a cooling rate of 0.1° C./min, and elution is performed at a heating rate of 1° C./min from 30° C. to 140° C., and wherein the equipment has been cleaned at 150° C.

The polymer as used in the present invention may for example be a linear low-density polyethylene. For example, the polymer may be a linear low-density polyethylene produced using a Ziegler-Natta type catalyst.

The polymer as used in the present invention may for example be produced using a gas-phase polymerisation process, using a slurry-phase polymerisation process, or using a solution polymerisation process.

The polymer as used in the present invention may for example comprise ≥80.0 wt % of moieties derived from ethylene and/or ≥5.0 wt % and <20.0 wt % of moieties derived from 1-hexene, with regard to the total weight of the polymer. Preferably, the polymer comprises ≥85.0 wt % of moieties derived from ethylene, more preferably ≥88.0 wt %. Preferably, the polymer comprises ≥80.0 wt % and ≤99.0 wt % of moieties derived from ethylene, more preferably ≥85.0 wt % and ≤95.0 wt %, even more preferably ≥88.0 wt % and ≤93.0 wt %.

The polymer as used in the present invention may for example comprise ≥5.0 wt %, preferably ≥7.0, wt %, more preferably ≥8.0 wt %, even more preferably ≥9.0 wt %, of moieties derived from 1-hexene, with regard to the total weight of the polymer. Preferably, the polymer comprises moieties derived from ethylene and ≥5.0 wt %, preferably ≥7.0, wt %, more preferably ≥8.0 wt %, even more preferably ≥9.0 wt %, of moieties derived from 1-hexene. More preferably, the polymer comprises moieties derived from ethylene and ≥5.0 wt % and ≤20.0 wt %, preferably ≥7.0, wt % and ≤17.0 wt %, more preferably ≥8.0 wt % and ≤15.0 wt %, even more preferably ≥9.0 wt % and ≤13.0 wt %, of moieties derived from 1-hexene.

For example, the polymer may comprise ≥80.0 wt % of moieties derived from ethylene and ≥5.0 wt %, preferably ≥7.0, wt %, more preferably ≥8.0 wt %, even more preferably ≥9.0 wt %, of moieties derived from 1-hexene. Preferably, the polymer comprises ≥80.0 wt % of moieties derived from ethylene and ≥5.0 wt % and ≤20.0 wt %, preferably ≥7.0, wt % and ≤17.0 wt %, more preferably ≥8.0 wt % and ≤15.0 wt %, even more preferably ≥9.0 wt % and ≤13.0 wt %, of moieties derived from 1-hexene.

In a certain embodiment, the polymer as used in the present invention consists of moieties derived from ethylene and moieties derived from 1-hexene. For example, the polymer may consist of moieties derived from ethylene and 5.0 wt %, preferably ≥7.0, wt %, more preferably ≥8.0 wt %, even more preferably ≥9.0 wt %, of moieties derived from 1-hexene. Preferably, the polymer consists of moieties derived from ethylene and 5.0 wt % and ≤20.0 wt %, preferably ≥7.0, wt % and ≤17.0 wt %, more preferably ≥8.0 wt % and ≤15.0 wt %, even more preferably ≥9.0 wt % and ≤13.0 wt %, of moieties derived from 1-hexene.

It is in certain embodiments of the present invention preferred that the polymer has a particular degree of long-chain branching. Long-chain branching, in the context of the present invention, is to be understood to reflect the presence of certain polymeric side chains that do not originate from incorporation of comonomers, but may for example be caused by reaction of polymeric chains comprising unsaturations with a further growing chain at a catalytic site. In certain embodiments, a certain presence of such long-chain branching is desirable. An indicator for the presence of long-chain branching, in the context of the present invention, may for example be the storage modulus G' at certain loss modulus G". A certain high storage modulus at defined loss modulus indicates the presence of a certain quantity of long-chain branching in the polymer. Particularly preferred indicators for the presence of a certain degree of long-chain branching are the storage modulus at loss modulus of 10.0 kPa, and the storage modulus at loss modulus of 1.0 kPa. The storage modulus and the loss modulus may for example be determined in accordance with ISO 6721-10 (2015).

For example, the polymer may have a storage modulus determined at loss modulus of 10.0 kPa of >2.0 kPa, preferably >2.2 kPa, more preferably >2.5 kPa. For example, the polymer may have a storage modulus determined at loss modulus of 1.0 kPa of >50 Pa, preferably >75 Pa, more preferably >100 Pa. For example, the polymer may have a storage modulus determined at loss modulus of 1.0 kPa of >50 Pa, preferably >75 Pa, more preferably >100 Pa, and <150 Pa. For example, the storage modulus at loss modulus of 10.0 kPa may be >2.0 kPa and the storage modulus at loss modulus of 1.0 kPa may be >50 Pa, preferably the storage modulus at loss modulus of 10.0 kPa is >2.5 kPa and the storage modulus at loss modulus of 1.0 kPa is >50 and <150 Pa. The storage modulus and the loss modulus may be determined in accordance with ISO 6721-10 (2015) at a temperature of 190° C.

The polymer may for example comprise <250, preferably <200, or >100 and <250, unsaturations per 1000000 chain carbon atoms, wherein the unsaturations are determined as the sum of the vinyl unsaturations, vinylene unsaturations, vinylidene unsaturations, and triakyl unsaturations, determined via $^1$H NMR. The number of unsaturations may be measured by $^{13}$C NMR on a Bruker Avance 500 spectrometer equipped with a cryogenically cooled probe head operating at 125° C., whereby the samples are dissolved at 130° C. in $C_2D_2Cl_4$ containing DBPC as stabiliser.

The polymer may for example have an $M_w/M_n$ ratio of >4.0, preferably >4.0 and <10.0, more preferably >5.0 and <8.0. For example, the polymer may have an $M_z/M_n$ ratio of >15.0, preferably >15.0 and <40.0, preferably >20.0 and <30.0, wherein $M_n$ is the number average molecular weight, $M_w$ is the weight average molecular weight, and $M_z$ is the z-average molecular weight, as determined in accordance with ASTM D6474 (2012). For example, the polymer may for example have an $M_w/M_n$ ratio of >4.0, preferably >4.0 and <10.0 and an $M_z/M_n$ ratio of >15.0, preferably >15.0 and <40.0.

It is preferred that for the polymer as used in the present invention, in the range of log($M_w$) between 4.0 and 5.5, the slope of the curve of the number of $CH_3$ branches per 1000 C atoms versus the log($M_w$) is negative, wherein the number of $CH_3$ branches is determined via SEC-DV with and IR5 infrared detector, in accordance with ASTM D6474 (2012).

The polymer may have an $M_w$ of for example >75 kg/mol, preferably >100 kg/mol, such as >75 and <200 kg/mol, preferably >100 and <150 kg/mol. The polymer may have an $M_n$ of for example >15 kg/mol, preferably >20 kg/mol, such as for example >15 and <40 kg/mol, preferably >20 and <30 kg/mol. The polymer may have an $M_z$ of >300 kg/mol, preferably >400 kg/mol, such as >300 and <700 kg/mol, preferably >400 and <650 kg/mol. Such characteristics of $M_w$, $M_z$ and/or $M_n$ may contribute to the improved stretchability of the film produced using the polymer of the invention.

In a certain embodiment, the invention also relates to a package comprising a bi-directionally oriented polyethylene film, wherein the bi-directionally oriented film comprises a polymer having moieties derived from ethylene and moieties derived from 1-hexene, wherein the polymer has:
(a) a density of ≥916 and ≤925 kg/m³ as determined in accordance with ASTM D792 (2008);
(b) a melt mass-flow rate of ≥0.6 and ≤5.0 g/10 min, as determined in accordance with ASTM D1238 (2013) at a temperature of 190° C. under a load of 2.16 kg;
(c) a fraction that is eluted in analytical temperature rising elution fractionation (a-TREF) at a temperature ≤30.0° C. of ≥11.0 wt %, with regard to the total weight of the polymer; and
(d) a fraction eluted in a-TREF at a temperature >94.0° C. of ≥20.0 wt %, with regard to the total weight of the polymer; and
(e) a fraction eluted in a-TREF at a temperature >30.0° C. and ≤94.0° C. of ≥40.0 and ≤64.0 wt %, with regard to the total weight of the polymer.

The package may for example comprise a bi-directionally oriented film that is oriented in the machine direction to a degree of between 3 and 10, and/or the film is oriented in the transverse direction to a degree of between 5 and 15, wherein the degree of orientation is the ratio between the dimension of the film in the particular direction subsequent to the orientation and the dimension prior to the orientation.

In certain of its embodiments, the invention also relates to a process for the production of package comprising a bi-directionally oriented film.

The invention also relates in one of its embodiments to a process for the production of a package comprising a bi-directionally oriented film, comprising the steps in this order of:
providing a polymer according to the invention;
converting the polymer to a melt using a melt extruder;
extruding the molten polymer and solidifying the polymer to form a cast film;
subjecting the cast film to heat to bring the film to a temperature of >70° C. and <$T_{pm}$, $T_{pm}$ being determined as peak melting temperature in accordance with ASTM D3418 (2008);
stretching the heated cast film by:
applying a stretching force in the machine direction (MD) to induce a drawing in the machine direction, and subsequently subjecting the obtained film to heat to bring the film to a temperature of between $T_{pm}$−25° C. and $T_{pm}$ under application of a stretching force in the transverse direction (TD) to induce a drawing in the transverse direction;
maintaining the stretching forces and temperature to ensure drawing in TD is maintained to a level of >85% of the drawing in TD as applied; and
releasing the stretch force and cooling the stretched films to obtain a bi-directionally oriented film; and optionally subjecting the bi-directionally oriented film to a surface treatment, preferably a corona treatment, to increase the hydrophilicity of the surface;
and subsequently forming the bi-directionally oriented film into a package.

In a particular embodiment, the process involves orienting the unoriented film to a drawing ratio of >4.0 in the machine direction and/or >8.5 in the transverse direction, wherein orientation in the machine direction is to be understood to be the ratio of a the length in the machine direction of a certain quantity of material after having been subjected to a stretching force in the machine direction to the length that that very same quantity of material had prior to having been subjected to that stretching force in the machine direction, and orientation or stretch in the transverse direction is to be understood to be the ratio of the width of the film after having been subjected to a stretching force in the transverse direction to the width of the film prior to having been subjected to that stretching force in the transverse direction.

The bi-directionally oriented films may for example have a thickness of ≥2.0 and ≤200.0 μm, preferably between 2 and 100 μm, more preferably between 5 and 100 μm, more preferably between 5 and 50 μm.

For example, the invention also relates in a certain embodiment to a process for the production of a package comprising a bi-directionally oriented film comprising a polymer having moieties derived from ethylene and moieties derived from 1-hexene, wherein the polymer has:
- (a) a density of ≥916 and ≤925 kg/m³ as determined in accordance with ASTM D792 (2008);
- (b) a melt mass-flow rate of ≥0.6 and ≤5.0 g/10 min, as determined in accordance with ASTM D1238 (2013) at a temperature of 190° C. under a load of 2.16 kg;
- (c) a fraction that is eluted in analytical temperature rising elution fractionation (a-TREF) at a temperature ≤30.0° C. of ≥11.0 wt %, with regard to the total weight of the polymer; and
- (d) a fraction eluted in a-TREF at a temperature >94.0° C. of ≥20.0 wt %, with regard to the total weight of the polymer; and
- (e) a fraction eluted in a-TREF at a temperature >30.0° C. and ≤94.0° C. of ≥40.0 and ≤64.0 wt %, with regard to the total weight of the polymer.

The film may for example have an orientation in the machine direction of at least 4.0. In the context of the present invention, orientation may also be referred to as stretch. Orientation in the machine direction is to be understood to be the ratio of a the length in the machine direction of a certain quantity of material after having been subjected to a stretching force in the machine direction to the length that that very same quantity of material had prior to having been subjected to that stretching force in the machine direction.

The film may for example have an orientation in the transverse direction of at least 8.5. Orientation or stretch in the transverse direction is to be understood to be the ratio of the width of the film after having been subjected to a stretching force in the transverse direction to the width of the film prior to having been subjected to that stretching force in the transverse direction.

Stretching in the transverse direction may for example be achieved by clamping the film in clamps positioned on either side of the film at certain distance intervals, applying a certain heat to the film to ensure the film is at a certain temperature, and applying an amount of force onto the clamps outwards from the plane of the film in the transverse direction. Such stretching may for example be done in a continuous operation.

The bi-directionally oriented film may for example comprise >80.0 wt % of the polymer, preferably >85.0 wt %, preferably >90.0 wt %, more preferably >95.0 wt %, for example >80.0 and <98.0 wt %, or >90.0 and <98.0 wt %, with regard to the total weight of the bi-directionally oriented film.

The package may for example be a heat-sealed bag. Such heat-sealed bags may be formed by contacting two surfaces of bi-directionally oriented film and subjecting it locally to a certain temperature and pressure so as to melt the two film surfaces together, thereby forming a seam. Multiple seams may be made according to this process to form a heat-sealed bag out of one of more pieces of the bi-directionally oriented film.

The invention also relates in one of its embodiments to a process for the preparation of a package comprising the steps of:
- (i) providing a bi-directionally oriented polyethylene film, wherein the bi-directionally oriented film comprises a polymer having moieties derived from ethylene and moieties derived from 1-hexene, wherein the polymer has:
  - (a) a density of ≥910 and ≤930 kg/m³, preferably ≥916 and ≤925 kg/m³, as determined in accordance with ASTM D792 (2008);
  - (b) a melt mass-flow rate of ≥0.2, preferably ≥0.5 or ≥0.6, and ≤5.0 g/10 min, as determined in accordance with ASTM D1238 (2013) at a temperature of 190° C. under a load of 2.16 kg;
  - (c) a fraction that is eluted in analytical temperature rising elution fractionation (a-TREF) at a temperature ≤30.0° C. of ≥8.0 wt %, preferably ≥11.0 wt %, with regard to the total weight of the polymer; and
  - (d) a fraction eluted in a-TREF at a temperature >94.0° C. of ≥20.0 wt %, with regard to the total weight of the polymer; and preferably
  - (e) a fraction eluted in a-TREF at a temperature >30.0° C. and ≤94.0° C. of ≥40.0 and ≤64.0 wt %, with regard to the total weight of the polymer; and
- (ii) subjecting the film to at least one heat sealing step to introduce at least one heat seal to obtain a package being a bag or pouch containing at least one seal obtained by thermal sealing of two layers of the polyethylene film.

Heat-sealed bags are well known for many applications, such as for containing foodstuff products, of which a well-known example is potato chips. As is well known to consumers, it is desirable that such packages can be opened in a controlled way, and that the package does not tear easily and uncontrolled, in a random manner. Such random tearing of the film of such package, also referred to as oblique tearing, is undesirable as it may well result in the package no longer being suitable to contain its contents.

Rather, it is desired that when a tear is introduced into such film by manual action, it propagates along a controlled line, without excessively diverging from its course.

It has now been found that a package according to the present invention allows for propagation of tears in the films along such controlled lines, in both the MD and TD direction of the films.

The invention will now be illustrated by the following non-limiting examples.

| Polymer materials | | |
|---|---|---|
| Polymer | PE-1 | PE-2 |
| MFR2 | 0.86 | 2.14 |
| Density | 920 | 921 |
| $T_{pm}$ | 124 | 124 |
| Crystallisation temperature | 111 | 111 |
| Ethylene units content | 89.3 | 89.0 |
| Comonomer units content | 10.7 | 11.0 |
| Comonomer type | C6 | C6 |
| $M_n$ | 27 | 18 |
| $M_w$ | 145 | 115 |
| $M_z$ | 540 | 450 |
| $M_w/M_n$ | 5.5 | 6.3 |
| $M_z/M_w$ | 3.7 | 3.9 |
| $M_z/M_n$ | 20.4 | 25.4 |
| a-TREF <30 | 11.8 | 13.5 |
| a-TREF 30-94 | 49.8 | 50.9 |
| a-TREF >94 | 38.4 | 35.6 |

Wherein:
the MFR2 is the melt mass flow rate as determined in accordance with ASTM D1238 (2013) at a temperature of 190° C. under a load of 2.16 kg, expressed in g/10 min;

the density is determined in accordance with ASTM D792 (2008), expressed in kg/m³;

the peak melting temperature $T_{pm}$ and the crystallisation temperature are determined using differential scanning calorimetry in accordance with ASTM D3418 (2018), expressed in °C.;

the ethylene units content indicates the weight quantity of units present in the polymer that are derived from ethylene, also referred to as the quantity of moieties derived from ethylene, with regard to the total weight of the polymer, expressed in wt %, as determined via 13C NMR;

the comonomer content indicates the weight quantity of units present in the polymer that are derived from the comonomer, also referred to as the quantity of moieties derived from the comonomer, with regard to the total weight of the polymer, expressed in wt %, as determined via 13C NMR;

the comonomer type indicates the type of comonomer used in the production of the polymer, where C6 is 1-hexene and C8 is 1-octene;

$M_n$ is the number average molecular weight, $M_w$ is the weight average molecular weight, and $M_z$ is the z-average molecular weight, wherein $M_n$, $M_w$, and $M_z$ are each expressed in kg/mol, and determined in accordance with ASTM D6474 (2012);

a-TREF<30 indicates the fraction of the polymer that is eluted in a-TREF according to the method presented above in the temperature range <30.0° C., expressed in wt %, and represents the amorphous fraction of the polymer, calculated by subtracting the a-TREF 30-94 and the a-TREF >94 fraction from 100.0 wt %;

a-TREF 30-94 indicates the fraction of the polymer that is eluted in a-TREF in the temperature range of >30.0 and ≤94.0° C., expressed in wt %, and represents the branched fraction of the polymer;

a-TREF >94 indicates the fraction of the polymer that is eluted in a-TREF in the temperature range of >94.0 and <140° C., expressed in wt %, and represents the linear fraction of the polymer; and PE-1 is a polyethylene of grade 6118NSF, obtainable from SABIC. PE-2 is a polyethylene of grade BX202, obtainable from SABIC.

Using the above polymers, three-layer biaxially oriented films were produced. The biaxially oriented films were produced in a cast film production line with subsequent sequential biaxial orientation. A set-up comprising three melt extruders was used, where an extruder A supplied material for a first skin layer A, an extruder B supplied material for inner layer B, and an extruder C supplied the material for the second skin layer C. The extruders were positioned such that the molten material was forced through a t-shaped die with a die gap of 3.0 mm, so that the arrangement of the layers in the obtained cast film was A/B/C.

Each of the extruders A, B and C was operated such to supply molten polymer material at a temperature of 260° C. The die temperature was 260° C.

The film as extruder through the t-shaped die was cast onto a chill roll to form a cast film having a thickness of about 840 μm.

The chilled cast film was subjected to stretching in the machine direction using a set of stretching rolls at a temperature of 98° C., followed by an annealing at 80° C., to induce a degree of stretching in the machine direction of 4.6.

Subsequently, the film was stretched in the transverse direction to a degree of stretching of 9.0 by subjecting the film to heat whilst applying a stretching force, wherein the film was passed through an oven through which the film was continuously transported, wherein the temperature was 140° C. at the entering zone of the oven, decreasing to 100° C. towards the exit of the oven. The skin layer C was subsequently subjected to a corona treatment of 25 W·min/m².

For each of examples E1 and E2, bi-directionally oriented 3-layer films having a thickness of 20 μm were obtained.

| Film compositions | | | |
|---|---|---|---|
| Example | Layer | Layer wt % | Composition |
| CE1 | — | — | Single layer blown film PE1 |
| E1 | A | 7 | 97 wt % PE-1 + 3 wt % AB |
|  | B | 86 | 100 wt % PE-1 |
|  | C | 7 | 97 wt % PE-1 + 3 wt % AB |
| E2 | A | 7 | 97 wt % PE-2 + 3 wt % AB |
|  | B | 86 | 100 wt % PE-2 |
|  | C | 7 | 97 wt % PE-2 + 3 wt % AB |

Wherein the percentage in the material composition relates to the quantity of the particular material, in wt % with regard to the total weight of the material of that given layer, and wherein the layer weight indicates the percentage of the weight of the given layer with regard to the total weight of the given experimental film. The layer thickness is expressed in pm. In the above table, AB refers to anti-block agent AB06001 LD, obtainable from Constab.

The comparative film of example CE1 was prepared via blown film extrusion using a Kuhne blown film line equipped with a 120 mm die, at a throughput of 25 kg/h and a blow-up ratio of 2.5. The extrusion temperature was 200° C. and the frost line 30 cm. The thickness of the blown film was 25 μm.

Of the thus obtained films, a number of properties were determined, as presented in the table below.

| Film properties | | | |
|---|---|---|---|
| Property | E1 | E2 | CE1 |
| Dart impact | 592 | 508 | 87 |
| TM-MD | 445 | 467 | 358 |
| TM-TD | 574 | 627 | 389 |
| TS-MD | 59 | 39 | 62 |
| TS-TD | 158 | 146 | 42 |
| Tear-MD | Controlled | Controlled | Oblique |
| Tear-TD | Controlled | Controllled | Oblique |

Wherein:
Dart impact is determined as impact failure weight in accordance with ASTM D1709—09, method A, at room temperature, expressed in grams.

TM is the tensile modulus, determined in the machine direction (MD) and transverse direction (TD) of the film, expressed in MPa, determined as 1% secant modulus in accordance with ASTM D882—18, using an initial sample length of 250 mm and a testing speed of 25 mm/min, at room temperature, using preload of 1 N.

TS is the tensile strength at break as determined in accordance with ASTM D882—18, in both machine direction (MD) and in transverse direction (TD), expressed in MPa, determined at room temperature using an initial sample length of 50 mm and a testing speed of 500 mm/min.

Tear is a visual observation of the direction of propagation of a tear induced according to the method of ASTM D1922—15, induced in either the machine direction (MD) or the transverse direction (TD) of the sample, wherein 'Controlled' indicates a non-oblique line propagation of the tear, and 'Oblique' indicates a propagation of the tear via an oblique, non-linear pattern.

From the results above, it can be observed that the tear orientation of the packages according to invention propagates in a non-oblique line, thereby allowing for opening of a package in a controlled manner.

The invention claimed is:

1. A package comprising a bi-directionally oriented polyethylene film, wherein the bi-directionally oriented film comprises a polymer having moieties derived from ethylene and moieties derived from 1-hexene, wherein the polymer has:
   (a) a density of ≥910 and ≤930 kg/m³ as determined in accordance with ASTM D792 (2008);
   (b) a melt mass-flow rate of ≥0.2 and ≤5.0 g/10 min, as determined in accordance with ASTM D1238 (2013) at a temperature of 190° C. under a load of 2.16 kg;
   (c) a fraction that is eluted in analytical temperature rising elution fractionation (a-TREF) at a temperature ≤30.0° C.of ≥8.0 wt % with regard to the total weight of the polymer; and
   (d) a fraction eluted in a-TREF at a temperature >94.0° C. of ≥20.0 wt %, with regard to the total weight of the polymer; and
   (e) optionally a fraction eluted in a-TREF at a temperature >30.0° C. and ≤94.0° C. of ≥40.0 and ≤64.0 wt %, with regard to the total weight of the polymer;
   wherein the package is a bag or pouch containing at least one seal obtained by thermal sealing of two layers of the polyethylene film, and
   wherein the polymer comprises <250 unsaturations per 1000000 chain carbon atoms, wherein the unsaturations are determined as the sum of the vinyl unsaturations, vinylene unsaturations, vinylidene unsaturations, and triakyl unsaturations, determined via $^1$H NMR.

2. The package according to claim 1, wherein in the polymer:
   the fraction (c) that is eluted in a-TREF at a temperature ≤30.0° C. is ≥8.0 and ≤16.0 wt %, with regard to the total weight of the polymer; and/or
   the fraction (d) that is eluted in a-TREF at a temperature >94.0° C. is ≥20.0 and ≤50.0 wt %, with regard to the total weight of the polymer; and/or
   the fraction that is eluted in a-TREF at a temperature >30.0 and ≤94.0° C. is ≥40.0 and ≤64.0 wt %.

3. The package according to claim 1, wherein the polymer comprises ≥5.0 wt % and <20.0 wt % of moieties derived from 1-hexene, with regard to the total weight of the polymer.

4. The package according to claim 1, wherein the polymer has:
   a storage modulus determined at loss modulus of 10.0 kPa of >2.0 kPa; and/or
   a storage modulus determined at loss modulus of 1.0 kPa of >50 Pa;
   wherein the storage modulus and the loss modulus are determined in accordance with ISO 6721-10 (2015), at a temperature of 190° C.

5. The package according to claim 1, wherein the polymer has an $M_w/M_n$ ratio of >4.0, and/or wherein the polymer has an $M_z/M_n$ ratio of >15.0, wherein $M_n$ is the number average molecular weight, $M_w$ is the weight average molecular weight, and $M_z$ is the z-average molecular weight, as determined in accordance with ASTM D6474 (2012).

6. The package according to claim 1, wherein in the range of log($M_w$) between 4.0 and 5.5, the slope of the curve of the number of $CH_3$ branches per 1000 C atoms versus the log($M_w$) is negative, wherein the number of $CH_3$ branches is determined via SEC-DV with and IR5 infrared detector, in accordance with ASTM D6474 (2012).

7. The package according to claim 1 wherein the bi-directionally oriented film comprises >80.0 wt % of the polymer with regard to the total weight of the bi-directionally oriented film.

8. The package according to claim 1, wherein the bi-directionally oriented film is oriented in the machine direction to a degree of between 3 and 10, and/or the film is oriented in the transverse direction to a degree of between 5 and 15, wherein the degree of orientation is the ratio between the dimension of the film in the particular direction subsequent to the orientation and the dimension prior to the orientation.

9. The package according to claim 1, wherein the bi-directionally oriented film has a thickness of ≥2.0 and ≤200.0 µm.

10. A process for the preparation of the package according to claim 1, the process comprising the steps of:
    (i) providing the bi-directionally oriented polyethylene film; and
    (ii) subjecting the film to at least one heat sealing step to introduce at least one heat seal to obtain a package being a bag or pouch containing at least one seal obtained by thermal sealing of two layers of the polyethylene film.

11. The process according to claim 10, wherein the bi-directionally oriented film has a thickness of ≥2.0 and ≤200.0 µm.

12. The process according to claim 10, wherein the bi-directionally oriented film is oriented in the machine direction to a degree of between 3 and 10, and/or the film is oriented in the transverse direction to a degree of between 5 and 15, wherein the degree of orientation is the ratio between the dimension of the film in the particular direction subsequent to the orientation and the dimension prior to the orientation.

13. The package according to claim 1, wherein the polymer comprises ≥88.0 wt % and ≤93.0 wt % of moieties derived from ethylene and ≥9.0 wt % and ≤13.0 wt % of moieties derived from 1-hexene, with regard to the total weight of the polymer.

* * * * *